Figure 1:
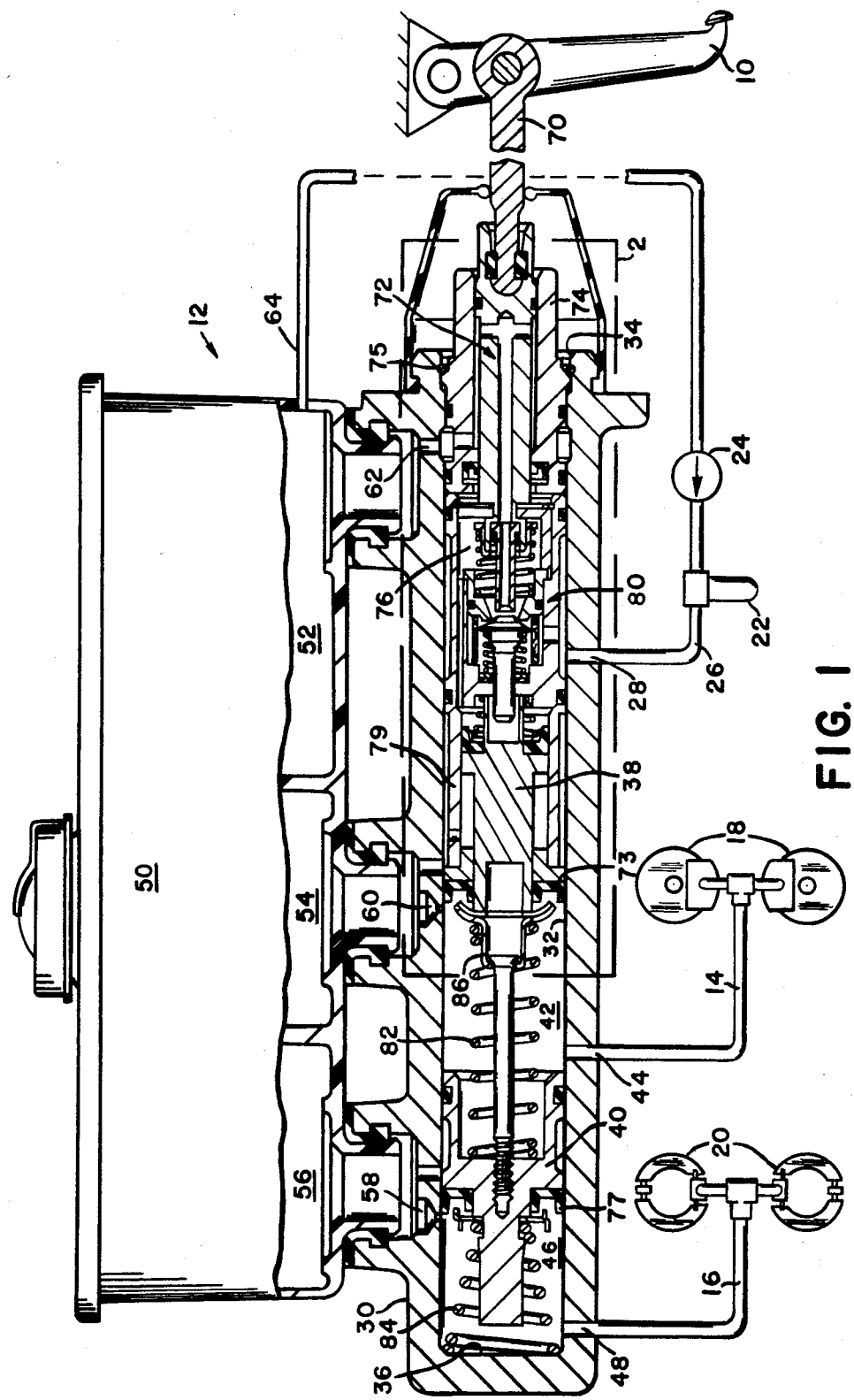

United States Patent [19]

Bach

[11] Patent Number: 4,665,701
[45] Date of Patent: May 19, 1987

[54] HYDRAULIC BRAKE BOOSTER WITH QUICK TAKE-UP AND REDUCED STROKE

[75] Inventor: Lloyd G. Bach, South Bend, Ind.

[73] Assignee: Allied Corporation, Morristown, N.J.

[21] Appl. No.: 793,015

[22] Filed: Oct. 30, 1985

[51] Int. Cl.$^4$ ............................................. B60T 13/00
[52] U.S. Cl. ...................... 60/547.1; 60/562; 60/577
[58] Field of Search ............... 60/547.1, 548, 562, 60/577

[56] References Cited

U.S. PATENT DOCUMENTS

| | | | |
|---|---|---|---|
| 3,926,093 | 12/1975 | Nakagawa | 60/547.1 |
| 4,196,592 | 4/1980 | Nomura | 60/547.1 |
| 4,433,543 | 2/1984 | Thomas | 60/547.1 |
| 4,435,960 | 3/1984 | Farr | 60/547.1 |
| 4,441,319 | 4/1984 | Brown | 60/562 |
| 4,490,977 | 1/1985 | Fulmer | 60/547.1 |
| 4,514,981 | 5/1985 | Brown et al. | 60/547.1 |

Primary Examiner—Abraham Hershkovitz
Attorney, Agent, or Firm—Larry J. Palguta; Ken C. Decker

[57] ABSTRACT

The brake booster (12) includes a housing (30) with at least one piston (38) disposed in a bore (32) to separate a pressure chamber (42) from a work chamber (76). The piston (38) engages a valve housing (79) containing therein a valve assembly (80) and the valve assembly (80) is connected to an input assembly (72) abutting the other end of the valve housing (79). The piston (38) is disposed within an extension (81) of the valve housing (79) and a seal (87) and spring (89) are disposed between the piston (38) and valve housing (79) so as to enhance initial movement of the piston (38) and provide a quick take-up and fast fill that compensates for fluid losses in the system while maintaining a reduced stroke for brake pedal travel.

19 Claims, 2 Drawing Figures

HYDRAULIC BRAKE BOOSTER WITH QUICK TAKE-UP AND REDUCED STROKE

The present invention relates to a hydraulic brake booster which provides the advantages of both quick take-up of fluid losses in the brakes and reduced stroke displacement of the brake pedal.

The present invention relates to a booster commonly referred to in the state of the art as a "full power" brake booster, such as those disclosed in copening application Ser. Nos. 793,021; 793,022; and 806,300. In a full power brake booster, an accumulator is charged with fluid pressure for selective use in providing a power assist. The accumulator is communicated to a booster housing and a valve assembly is operable to control communication of fluid pressure from the accumulator to a power chamber wherein the fluid pressure acts against at least one piston to communicate fluid pressure from the housing to a brake circuit. The valve assembly is actuated by an input assembly which controls operation of the valve assembly. U.S. Pat. No. 4,490,977 discloses a full power hydraulic brake booster which includes a resilient block that provides for a small movement of the brake pedal which results in greater movement of the pistons, the primary piston moving in response to a fluid pressure communicated to a power chamber. The resilient block provides a "false travel" unrelated to the vehicle braking system fluid displacement which occurs during a braking cycle.

In certain applications, it is preferable that the vehicle operator be provided with reduced travel of the brake pedal during the braking application, the reduced pedal travel corresponding to a greater displacement of the pistons and combined with a highly repeatable and predictable quick take-up for fast fill of fluid losses in the brake system so that the brakes are in position for operation. It is highly preferable to effect initial travel of the pistons of the brake booster in order to displace fluid through the brake circuits and compensate or take up the fluid losses in the system. In other words, there is an initial portion of the brake pedal stroke which provides little resistance to the vehicle operator because the pistons are initially displacing fluid through the brake circuits which require a certain displacement of fluid before the brakes are fully in operable position to commence braking. It is desirable to use the booster pressure provided by the accumulator to move the primary and secondary pistons to compensate for fluid losses in the brake lines and brakes, while eliminating the initial displacement of the brake pedal which provides little response or weak reaction force to the vehicle operator. U.S. Pat. Nos. 4,514,981 and 4,441,319 illustrate brake boosters that provide for full stroke travel of the brake pedal in response to a corresponding actuation of the primary and secondary pistons, but having an initial displacement of the brake pedal which provides little resistance to the vehicle operator because of the necessary compensation for fluid losses in the master cylinder, brake lines and brakes. Thus, it is desirable to provide a hydraulic brake booster which provides both (1) an initial displacement of the primary and secondary pistons in order to compensate for system fluid losses without a corresponding displacement of the brake pedal through a short stroke which provides little reaction to the vehicle operator, and (2) provides reduced stroke travel of the brake pedal corresponding to a greater displacement of the primary and secondary pistons.

The present invention provides a brake booster having a housing with at least one outlet communicating with a brake, a piston movably disposed within the housing to separate a pressure chamber from a work chamber, an input assembly to control communication of fluid pressure to the work chamber wherein the fluid pressure biases the piston to move from a rest position to a braking position, a valve assembly operable in response to movement of the input assembly, and an inlet formed by the housing to communicate fluid pressure to the valve assembly, characterized in that the brake booster comprises a valve housing disposed between said piston and input assembly and the valve assembly disposed within the valve housing, the valve housing including an extension which slidably receives therein the piston, and resilient means disposed between the piston and valve housing to bias the piston away from the valve housing.

The invention will now be described with reference to the accompanying drawings, which illustrate an embodiment of the invention.

Figure 2:
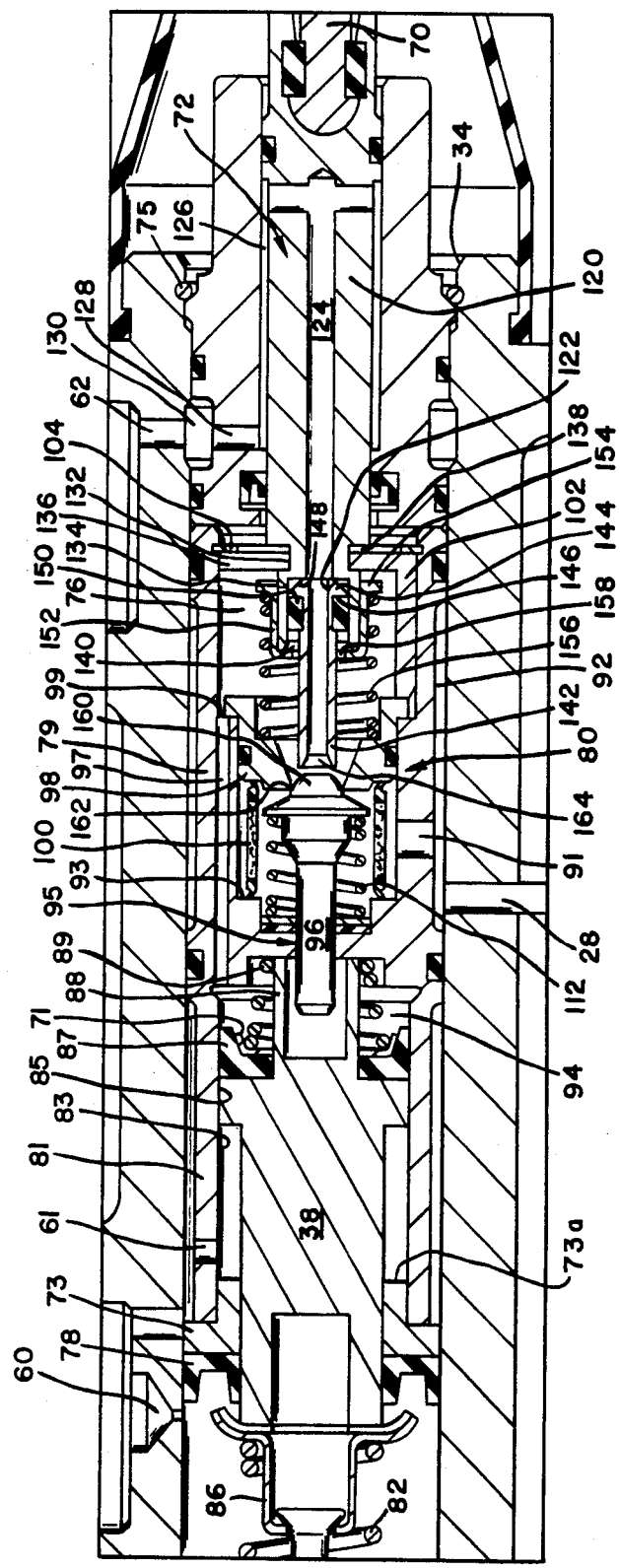

FIG. 1 is a schematic view of a brake system showing the brake booster of the present invention is cross section; and FIG. 2 is an enlarged view of the circumscribed portion 2 in FIG. 1.

A brake system includes a brake pedal 10 connected to a brake booster 12. The brake booster 12 includes conduits 14 and 16 communicating, respectively, with brakes 18 and 20 associated with the vehicle wheels. A fluid pressure source or accumulator 22 is maintained at a predetermined fluid pressure level by a pump 24 and the accumulator 22 is in communication with brake booster 12 via a conduit 26 and brake booster inlet 28. The brake system operates in the conventional manner in that the movement of the brake pedal to an actuated or braking position results in the brake booster 12 communicating fluid pressure to the brakes 18 and 20.

Brake booster 12 includes a housing 30 with a bore 32 leading from an open end 34 to a bottom wall 36. A primary piston 38 cooperates with the secondary piston 40, housing 30, and enlarged diameter head 73, to define a primary pressure chamber 42 therebetween which communicates via a first outlet 44 with the conduit 14. The secondary piston 40 cooperates with housing 30 to define a secondary pressure chamber 46 at the bottom wall in communication with the conduit 16 via a second outlet 48.

A reservoir 50 includes at least three chambers 52, 54, and 56. The chamber 56 communicates via port 58 with secondary pressure chamber 46 when the secondary piston 40 is in a rest position, as shown. The chamber 54 communicates via port 60 with primary pressure chamber 42 when the primary piston 38 is in a rest position. The chamber 52 communicates with the bore 32 via port 62 and a work chamber 76, and also communicates with the pump 24 via conduit 64.

An input member 70 connects with brake pedal 10 and cooperates with a plug 74 to close the open end 34 of bore 32. A snap ring 75 retains the plug within bore 32, and input assembly 72 cooperates with plug 74 to define a work chamber 76 within bore 32 and to the right side of primary piston 38. Bore 32 receives slidably a valve housing 79. The valve housing 79 receives therein a valve assembly 80 for cooperation with the input assembly in a manner hereinafter described. A spring 82 between the pistons 38 and 40 biases the primary piston 38 and valve housing 79 to their rest position as shown. A spring 84 between end wall 36 and secondary piston 40 biases piston 40 to its rest position, and piston 40 engages a top hat assembly 86 secured to primary piston 38.

Turning to FIG. 2, valve housing 79 includes an extension 81 which slidably receives therein primary piston 38. Extension 81 includes an enlarged diameter head 73 abutting seal 78 disposed between primary piston 38 and bore 32. Head 73 includes piston stop 73a. Piston 38 abuts top hat assembly 86 which engages spring 82, and at the other end piston flange 85 slides within cavity 83 of extension 81 and positions seal 87 disposed about hollow extension 88, flange 85 defining an enlarged diameter area of piston 38 which is a differential area piston. Orifice 61 permits fluid to exit cavity 83 at a controlled rate to damp the movement of piston 38, and the orifice size can be modified accordingly. Piston flange 85 may engage piston stop 73a which limits the travel of differential area piston 38 relative to valve housing 79. Hollow extension 88 receives an end of a valve member 96, and positions an end of resilient spring 89 that extends between valve housing 79 and seat 71 positioned by seal 87. Piston 38 and housing 79 define therebetween variable volume chamber 94. A clearance 92 of valve housing 79 provides for fluid communication from conduit 28 to opening 91 and valve assembly 80. Valve housing 79 includes an opening 95 receiving the valve member 96 and a valve seat 98 engages the end of valve member 96 in the illustrated rest position. A filter 100 is disposed between housing wall 93 and valve seat 98 so that all of the fluid communicated through opening 91 is filtered to remove contaminants therefrom. In order to retain valve assembly 80 within valve housing 79, a sleeve 102 engages valve seat 98 and a snap ring 104 opposes withdrawal of the sleeve. A spring 112 extends between valve housing 79 and valve member 96 to bias valve member 96 into engagement with valve seat 98. With valve member 96 engaging valve seat 98, fluid pressure communicated through opening 91 is trapped on left side of valve seat 98. The effective area for valve member 98 is equal to the diameter of the valve member extending through the opening 95 so that the valve member is substantially pressure balanced.

The input assembly 72 includes an input rod 120 and an end projection 122. The rod and projection include axial passages 124 leading from work chamber 76 to a plug clearance 126, which in turn communicates with an opening 128 and clearance 130 in communication with port 62 for the reservoir chamber 52. Therefore, in the rest position of the input assembly 72, work chamber 76 is in communication with reservoir chamber 52. The input rod 120 forms a groove 132 adjacent an enlarged head 134. The sleeve 102 is slotted at 136 to permit transverse attachment of sleeve 102 to input rod 120. With the sleeve in the groove 132, an axial clearance or gap 138 is formed between the sleeve and input rod to permit slight relative axial movement therebetween. The enlarged head 134 defines a recess 140 leading to the passage 124 and end projection 122 is disposed within recess 140. End projection 122 forms a small diameter end portion 142 adjacent valve seat 98 and at the opposite end a large diameter portion 144. The large diameter portion separates a groove 146 on the end projection from a tapered edge 148. The groove 146 receives a seal 150. The seal 150 engages the wall of recess 140 to yieldably dispose end projection 122 coaxial with input rod 120. A collar 152 is fitted over the enlarged head 134. The collar 152 forms a flange 154 acting as a spring rest for a spring 156. The spring extends from valve seat 98 to collar 152 to bias enlarged head 134 to a rest position adjacent sleeve 102 and in spaced relation to the valve member 96. The collar forms an opening 158 receiving the end projection within a radial clearance between the wall of opening 158 and the end projection. The diameter of collar flange 154 is larger than the width of the slot 136 so that the sleeve 102 is prevented from separating from rod 120 so long as the collar 152 remains fitted to the enlarged head. The basic construction of valve assembly 80 is the same as disclosed in U.S. Pat. No. 4,514,981 owned by the same assignee as herein and incorporated by reference.

Valve member 96 is engageable with a part spherical edge 162 on valve seat 98. The left end 164 of projection 122 is engageable with spherical end 160 during braking to close passage 124 and move spherical end 160 away from the edge 162. In order to permit end 164 to seek alignment with ball 160, the end projection 22 is capable of pivoting relative to the head 134.

During a brake application, pedal 10 is depressed by the vehicle operator to move input assembly 72 toward primary piston 38. The initial engagement of the vehicle operator's foot with the brake pedal results in a very small initial displacement which causes end projection 122 to engage spherical end 160 to seek a sealing engagement therewith and close communication between work chamber 76 and passage 124. Further slight movement of the input assembly moves spherical end 160 away from edge 162 so that fluid pressure from accumulator 22 is communicated to work chamber 76 via conduit 26, inlet 28, clearance 92, opening 91, filter 100, and edge 162, so that the valve housing 79 moves slightly and causes seals 78 and 77 to close compensation ports 60 and 58. The ports 60 and 58 are closed before piston 38 moves relative to valve housing 79 so that there is a predetermined and predictable amount of fluid available for brake operation. The initial surge of fluid pressure through valve seat 98 also results in fluid pressure flowing through shoulder 9 via passage 97 to power chamber 94. Increased fluid pressure acting against primary piston 38 moves it to the left against spring 82 and secondary piston 40. Primary piston 38 is assisted by spring 89. Pistons 38 and 40 and valve housing 79 in contact with head 73 compress fluid within chambers 42 and 46 to displace fluid through the respective brake lines to the brakes and place the brakes in a ready position for the commencement of braking. As the primary piston 38 moves further to the left to increase the volume of chamber 94, both the primary and secondary pistons travel in a predictable manner and further than valve housing 79. Thus, boost pressure is utilized to move the primary and secondary pistons in order to compensate for fluid losses in the master cylinder, brake lines and brakes without any corresponding "soft" pedal travel experienced by the vehicle operator. The initial slight movement of the brake pedal results in the hydraulic booster compensating for fluid losses throughout the system and placing the braking system in a ready position to commence braking upon further movement of the brake pedal by the vehicle operator. Upon accomplishing the compensation for fluid losses within the system, the pistons will be displaced a greater distance than the brake pedal is displaced so that there is a reduced pedal travel. When a predetermined fluid pressure level is reached in work chamber 76 corresponding to an associated brake pedal input force, the primary piston moves slightly relative to the end projection 122 to re-engage (by pressure increase in chamber 94) the spherical end 160 with edge 162 to prevent further buildup of fluid pressure in the work chamber. Further braking separates the spherical end 160 from valve seat 98 to increase the communication of fluid pressure to the work chamber. Upon termination of braking, spring 156 biases the enlarged head 134 to abut sleeve 102 in order to reengage spherical end 160 with seat 98 and close communication of fluid pressure to the work chamber. Springs 82 and 84 bias the pistons and input assembly to return to their rest positions. Piston 38 returns toward the at-rest position illustrated before valve housing 79 typically returns to the rest position so that fluid pressure in the master cylinder is decreased before the ports 58 and 60 are opened by the associated seals.

In the event of a failure in the fluid pressure souce or in the communication of fluid pressure to the work chamber, the vehicle operator may manually push the input assembly through a distance equal to gap 138 so that the wall of groove 132 engages the right side of sleeve 102, the input assembly then moving the primary and secondary pistons to generate fluid pressure for brakes 18 and 20.

The hydraulic brake booster of the present invention accomplishes the advantages desired for the particular application. First, the booster pressure is utilized to provide displacement of the primary and secondary pistons in order to compensate for fluid losses within the brake system, without requiring any brake pedal displacement during which the vehicle operator experiences little resistance to displacement of the brake pedal. The "soft" stroke displacement of the brake pedal which had been experienced in the prior hydraulic brake boosters has been effectively eliminated while still accomplishing compensation for fluid losses within the brake system. Second, the fluid losses within the brake system have been compensated for while providing a short displacement or stroke of the brake pedal and a much greater displacement of the primary and secondary pistons of the master cylinder. The hydraulic brake booster of the present invention provides a reduced stroke displacement of the brake pedal relative to the displacement of the primary and secondary piston so that the vehicle operator may displace the brake pedal through the desired shorter stroke during the brake application. This is accomplished by having the primary piston able to move independently of the valve housing. Thus, the initial predetermined movement of the primary piston effects the quick take-up function to compensate for brake system fluid losses, and then the vehicle operator experiences a "reduced stroke" displacement of the brake pedal corresponding to a greater displacement of the primary and secondary pistons. An advantage of the reduced stroke displacement of the brake pedal is that the vehicle operator is provided with faster braking responsiveness in a high performance vehicle. Additionally, in the manual mode of operation, there are no stroke losses other than the small distance provided by gap 138.

Many variations of the invention described herein are feasible by one skilled in the art, and as such, are intended to fall within the scope of the appended claims.

I claim:

1. A brake booster having a housing with at least one outlet communicating with a brake, a piston movably disposed within the housing between a pressure chamber and a work chamber, an input assembly to control communication of fluid pressure to the work chamber wherein the fluid pressure biases the piston to move from a rest position to a braking position, a valve assembly operable in response to movement of the input assembly, and an inlet formed by the housing to communicate fluid pressure to the valve assembly, characterized in that the brake booster comprises a valve housing disposed between said pressure chamber and input assembly and the valve assembly disposed within the valve housing, the valve housing including an extension which slidably receives therein the piston, the piston and valve housing defining a variable volume chamber which receives said fluid pressure from the work chamber, the extension having a stop engageable by the piston, and the piston comprising a differential area piston, displacement of the piston relative to the valve housing by fluid pressure in the variable volume chamber being maintained even when pressure in the pressure chamber exceeds the fluid pressure in the variable volume chamber as a result of the differential area of said piston, and said displacement limited to a predetermined amount by engagement of the piston with the stop.

2. The brake booster in accordance with claim 1, wherein the extension and piston define a cavity therebetween and the extension includes orifice means for movement of fluid therethrough as the piston moves relative to the valve housing.

3. The brake booster in accordance with claim 1, further comprising resilient means disposed between the piston and valve housing to bias said piston away from said valve housing.

4. The brake booster in accordance with claim 3, further comprising sealing means for effecting a fluid seal between said piston and extension.

5. The brake booster in accordance with claim 4, wherein the sealing means is biased by said resilient means.

6. The brake booster in accordance with claim 1, wherein said extension comprises a tubular extension which engages a seal disposed about said piston.

7. The brake booster in accordance with claim 6, wherein the valve housing comprises an internal opening with a portion of the valve assembly extending therefrom, the piston including a hollow extension receiving therein the portion of the valve assembly and providing support for resilient means disposed between the piston and valve housing.

8. The brake booster in accordance with claim 7, wherein the valve assembly includes a valve member normally closing fluid communication between a fluid pressure source and the work chamber.

9. The brake booster in accordance with claim 8, wherein the input assembly includes an end projection with a passage therein normally communicating the work chamber with a reservoir associated with the brake booster.

10. The brake booster in accordance with claim 9, wherein the end projection is sealing engaged with the valve member to close the passage when the valve member is moved by the end projection to communicate the fluid pressure with the work chamber.

11. The brake booster in accordance with claim 10, wherein the end projection cooperates with said input assembly to carry a sealing member therebetween, the sealing member sealing said passage from fluid pressure communicated to the work chamber and biasing said end projection to a coaxial relationship with said input assembly.

12. A brake booster having a housing with at least one outlet communicating with a brake, the piston movably disposed within the housing between a pressure chamber and a work chamber, an input assembly movable within said housing and defining an end of said work chamber, a valve housing disposed between said pressure chamber and input assembly, the valve housing having a valve assembly disposed therein and operable in response to movement of the input assembly to control communication of fluid pressure to the work chamber wherein the fluid pressure biases the piston to move from a rest position to a braking position, the valve assembly including a valve member normally closing fluid communication between a fluid pressure source and the work chamber, the valve housing including an inlet for receiving fluid pressure from said pressure source and communicating the fluid pressure to said valve assembly, an extension of said valve housing slidably receiving therein the piston, the piston comprising a differential area piston and defining a variable volume chamber with the valve housing, the variable volume chamber receiving fluid pressure from the work chamber, the extension having a stop engageable by the differential area piston, the piston and extension defining a cavity therebetween and the extension having an orifice for fluid communication with the cavity, and resilient means disposed between the piston and valve housing to bias said piston away from said valve housing, displacement of the piston relative to the valve housing by fluid pressure in the variable volume chamber being maintained, even when said pressure in the pressure chamber exceeds the fluid pressure in the variable volume chamber as a result of the differential area of said piston, and said displacement limited to a predetermined amount by engagement of the piston with the stop.

13. The brake booster in accordance with claim 12, wherein the housing of the booster includes compensation ports communicating reservoir means with a bore in the housing of the booster, actuation of the input assembly effecting closure of the ports before effecting movement of the piston relative to the valve housing.

14. The brake booster in accordance with claim 12, further comprising sealing means for effecting a fluid seal between said piston and extension.

15. The brake booster in accordance with claim 14, wherein the sealing means is biased by said resilient means.

16. The brake booster in accordance with claim 12, wherein said extension comprises a tubular extension which engages a seal disposed about said piston.

17. The brake booster in accordance with claim 16, wherein the valve housing comprises an opening with a portion of the valve assembly extending therefrom, the piston including a hollow extension receiving therein the portion of the valve assembly and providing support for said resilient means.

18. The brake booster in accordance with claim 17, wherein the input assembly includes an end projection with a passage therein normally communicating the work chamber with a reservoir associated with the brake booster.

19. The brake booster in accordance with claim 18, wherein the end projection is sealingly engageable with said valve member to close the passage when the valve member is moved by the end projection to communicate the fluid pressure source with the work chamber.

* * * * *